United States Patent
Jogikalmath

(10) Patent No.: US 11,066,554 B2
(45) Date of Patent: Jul. 20, 2021

(54) MELTABLE INTUMESCENT FLAME RETARDANT COMPOSITIONS

(71) Applicant: QED LABS, INC., Billerica, MA (US)

(72) Inventor: Gangadhar Jogikalmath, Chestnut Hill, MA (US)

(73) Assignee: QED Labs, Inc., Waltham, MA (US)

( * ) Notice: Subject to any disclaimer, the term of this patent is extended or adjusted under 35 U.S.C. 154(b) by 38 days.

(21) Appl. No.: 16/349,804

(22) PCT Filed: Nov. 26, 2017

(86) PCT No.: PCT/US2017/063207
§ 371 (c)(1),
(2) Date: May 14, 2019

(87) PCT Pub. No.: WO2018/098408
PCT Pub. Date: May 31, 2018

(65) Prior Publication Data
US 2019/0359824 A1    Nov. 28, 2019

Related U.S. Application Data

(60) Provisional application No. 62/426,940, filed on Nov. 28, 2016.

(51) Int. Cl.
*C08L 77/06* (2006.01)
*C08K 5/00* (2006.01)
(Continued)

(52) U.S. Cl.
CPC ............ *C08L 77/06* (2013.01); *C08K 5/0066* (2013.01); *C08K 5/3462* (2013.01);
(Continued)

(58) Field of Classification Search
CPC ....... C08L 77/06; C08L 67/02; C08K 5/0066; C08K 5/3462; C08K 5/3492; C08K 5/5333; D01F 1/07; D01F 8/12; D01F 8/14
(Continued)

(56) References Cited

U.S. PATENT DOCUMENTS 4,187,377 A    2/1980   Narisawa et al.
4,794,037 A  * 12/1988   Hosoda ................. D06M 11/47
                                                        428/361
(Continued)

FOREIGN PATENT DOCUMENTS

CN    101580976 A    11/2009
CN    101608352 A    12/2009
(Continued)

OTHER PUBLICATIONS

Database WPI Week 201001 Thomson Scientific, XP-002799443, 2017, London, GB.
(Continued)

*Primary Examiner* — Michael Bernshteyn
(74) *Attorney, Agent, or Firm* — Hodgson Russ LLP

(57) ABSTRACT

Meltable flame retardant compositions and fibers fabricated thereof are provided. Compositions of the present disclosure comprise a polymer, a nitrogenous compounds and/or a phosphorus compound. Fibers and compositions of the present disclosure can be used to make fabrics. When fibers, fabrics, and compositions of the present disclosure are exposed to flame, non-flammable gases are released such that the flames is retarded and/or extinguished.

6 Claims, 2 Drawing Sheets

Acetoguanamine (AG) (58% N)
Melting point - 270C

Benzoguanamine (BG) (40% N)
Melting point - 220 C

(51) Int. Cl.
  *C08K 5/34* (2006.01)
  *C08K 5/53* (2006.01)
  *C08L 67/02* (2006.01)
  *D01F 1/07* (2006.01)
  *D01F 8/12* (2006.01)
  *D01F 8/14* (2006.01)
  *C08K 5/3462* (2006.01)
  *C08K 5/3492* (2006.01)
  *C08K 5/5333* (2006.01)

(52) U.S. Cl.
  CPC .......... *C08K 5/3492* (2013.01); *C08K 5/5333* (2013.01); *C08L 67/02* (2013.01); *D01F 1/07* (2013.01); *D01F 8/12* (2013.01); *D01F 8/14* (2013.01)

(58) Field of Classification Search
  USPC ........................................................ 524/538
  See application file for complete search history.

(56) References Cited

U.S. PATENT DOCUMENTS

| | | | |
|---|---|---|---|
| 2003/0193045 A1* | 10/2003 | Takeuchi | C07F 9/5537 252/601 |
| 2008/0139711 A1 | 6/2008 | Borade et al. | |
| 2013/0244527 A1 | 9/2013 | Sarzotti et al. | |
| 2016/0075849 A1* | 3/2016 | Kaul | C08K 5/0066 524/430 |
| 2016/0348279 A1 | 12/2016 | Ramappa et al. | |
| 2017/0267815 A1 | 9/2017 | Ramappa et al. | |
| 2017/0298202 A1 | 10/2017 | Ramappa et al. | |
| 2019/0048188 A1 | 2/2019 | Jogikalmath et al. | |

FOREIGN PATENT DOCUMENTS

| | | | | |
|---|---|---|---|---|
| CN | 105603564 A | 5/2016 | | |
| CN | 106103563 A | 11/2016 | | |
| WO | 2015109135 A2 | 7/2015 | | |
| WO | WO-2015109135 A2 * | 7/2015 | ............... | C08K 9/04 |

OTHER PUBLICATIONS

Nguyen et al., "Understanding the Mechanism of Action of Triazine-Phosphonate Derivatives as Flame Retardants for Cotton Fabric," Molecules, 2015, 20, pp. 11236-11256.

Tienan, G, Chinese Fire Protection Manual, Shanghai Science and Technology Press, Dec. 31, 2006, vol. 10, 3 pages.

* cited by examiner

MELTABLE INTUMESCENT FLAME RETARDANT COMPOSITIONS

CROSS REFERENCE TO RELATED APPLICATIONS

This application claims priority to U.S. Provisional Application No. 62/426,940, filed on Nov. 28, 2016, the disclosure of which is hereby incorporated by reference.

FIELD OF THE DISCLOSURE

The present disclosure relates to compositions, articles, and methods providing flame and fire protection, including fabrics with improved melt dripping properties.

BACKGROUND OF THE DISCLOSURE

Flame retardancy and voidance of melt dripping are two important properties in articles such as fabrics. Flame retardants are chemicals that resist the spread of fire and are used in, for example, thermoplastics, textiles, and coatings. Typically, flame retardants are halogenated (i.e., brominated) or phosphorus based. However, these flame retardant and fire protection materials are generally inefficient or have negative impacts on the environment. For example, halogenated flame retardants, such as brominated flame retardants, are persistent, bio-accumulative, and toxic to both humans and the environment. Brominated flame retardants are suspected of causing negative neurobehavioral effects and endocrine disruption. Brominated flame retardants also release toxic gases which can cause more deaths than fire itself.

Non-halogenated flame retardants, such as phosphorus based flame retardants, are generally non-toxic and environmentally friendly. However, phosphorus based flame retardants tend to be less efficient than halogenated flame retardants. Generally, these phosphorus based flame retardants require high loading (i.e. doses/volumes) which reduces efficacy. Such high doses may compromise the mechanical properties, thereby increasing susceptibility to failure, of fabrics and other materials to which the phosphorus based flame retardants are applied. Phosphorus flame retardants also tend to leach out of the materials to the surface rendering the material vulnerable to fire.

Non-halogenated flame retardant additives currently used in the market are less efficient than halogenated flame retardants. For example, polymers may contain between 30% and 60% of phosphorus based flame retardant substances where only 15% of halogenated flame retardants may be sufficient. This higher percentage can compromise the structural integrity of the article and can cause the properties of the final product to deteriorate.

Melt dripping of plastics or fabrics when exposed to flame or fire is also undesirable. Melt drips on the skin of a wearer can cause grievous bodily injury because a hot, sticky, melted substance formed from the plastic or fabric can cause localized and extremely severe burns. For example, the polyamide (such as nylon 6 and nylon 66) uniforms for defense personnel show undesirable melt dripping problems when exposed to flame.

Many intumescent flame retardants based on nitrogen based compounds are available and impart flame retardancy to polymers. Examples include, melamine, melamine cyanurates, melamine phosphates and their derivatives. Many such available intumescent flame retardants are of particulate nature and lack a melting point. Such materials cannot be used in melt spinning applications where the non-meltable nature of the particles might lead to agglomeration and occlusion of pores in spinnerets.

Therefore, it is desirable to have fibers and fabrics and other articles that show improved flame retardancy and that are capable of lowered melt dripping when exposed to flame.

BRIEF SUMMARY OF THE DISCLOSURE

In a first embodiment, a composition is provided. The composition includes a first polymer and a nitrogenous compound. A nitrogenous compound can be defined as an organic or inorganic molecule that contains nitrogen and which has a melting point in the range of $-50°$ C. to $400°$ C. A first polymer and one or more nitrogenous compounds may form a fiber and subsequently a fabric. The composition releases non-flammable gases from the nitrogenous compound upon exposure of the composition to flame.

In a second embodiment, a fabric is provided. The fabric has a plurality of fibers which are made with a polymer containing meltable triazine compositions. In some embodiments, this fabric may be woven. When such fabrics or fibers are exposed to flame, non-flammable gases such as nitrogen and ammonia are released from the meltable triazines contained within the fibers such that the flames are retarded and in some cases extinguished.

The meltable triazine compounds can be melt blended with one type of polymer. For example, such a polymer can be nylon, polyester, polypropylene, polycarbonate, polyacetal, and combinations thereof. For example, the polymer can also be polyolefins, polystyrenes, other such polymers, and other combinations thereof capable of forming fibers. Such fibers containing meltable triazine compositions are referred to as first fibers.

The fabric can be made of two different types of fibers. The different types of fibers can be referred to as different sets of fibers (i.e., the first fiber describes a fiber from the first set of fibers).

In certain embodiments, the first fibers may be spiral wound on the second fibers. The first fibers also may be woven in the same or an orthogonal direction to the second fibers. In other embodiments, the first and second fibers also can form a bicomponent fiber.

The fabric may include a plurality of third fibers. For example, the third fibers can be at least one of cotton, rayon, wool, hair, silk, or an aramid (such as KEVLAR). These third fibers may have a higher melting temperature than either the first fibers or the second fibers.

The fabric also may include a plurality of metallic fibers as a third or fourth fiber. For example, the metallic fibers comprise copper, iron, silicon, alloys thereof, and combinations thereof.

A fabric of the present disclosure can further comprise a plurality of functionalized nanoparticles.

In some embodiments, the first functional group or second functional group may include a flame retardant, such as a phosphorus compound. Non-limiting examples of phosphorus compounds include any pentavalent phosphorus compound.

In certain embodiments, at least one of the first polymer or second polymer may be a polyolefin that includes a water-releasing additive. Non-limiting examples of polyolefins include linear low-density polyethylene (LLDPE), low-density polyethylene (LDPE), high-density polyethylene (HDPE), or polypropylene (PP).

In yet other embodiments, at least one of the first polymer or the second polymer may have a lower melting point than the other and contains a reactive crosslinker, such as an epoxy modified 9,10-dihydro-9-oxy-10-phosphaphenanthrene-10-oxide (DOPO).

Benign and non-toxic flame retardants that are bonded with polymers are provided as a third embodiment. Flame retardant molecules such as meltable triazine molecules described herein may be anchored to a polymer matrix of an article or finished product, and are stably and uniformly distributed therein. Anchoring the flame retardant molecules to the polymer matrix can reduce the risk of the flame retardant molecules leaching and blooming to the surface of the article. This interlocking or anchoring of flame retardant molecules also can help offset the loss in mechanical properties of the finished polymer product when the flame retardants are used in excess to achieve a fire resistance rating. An advantage of attaching anchors to flame retardant molecules is that this can allow the anchored flame retardants to be mixed with a polymer matrix, even when the melting points of the flame retardant and the polymer matrix are substantially different. As long as the anchor molecules are capable of melting, mixing, and integrating with the polymer matrix during mixing, the flame retardant molecule may be carried along and distributed within the matrix.

In some embodiments, anchors are attached to the flame retardant molecules via either covalent, electrostatic, or van der Waals interactions prior to addition into the polymer matrix. In other embodiments, the flame retardants may be reacted or bound to an anchor during the processing of adding the flame retardant to the polymer article. In these embodiments, both the anchor and the flame retardants may be separately added during processing of the polymer into a final article.

Flame retardant articles are disclosed. The flame retardant article, in addition to the nitrogenous flame retardants described herein, also may include a phosphorus based flame retardant chemically joined (e.g., covalently linked) to a reactive functional group of an anchor molecule forming a conjugate, wherein the conjugate is dispersed in the polymer matrix.

Methods of making flame retardant articles are disclosed. The method may include reacting a phosphorus based flame retardant with a reactive functional group of an anchor molecule forming a modified flame retardant, and mixing the modified flame retardant with a polymer matrix. The reacting step may further include reacting the phosphorus based flame retardant with at least one of an epoxy functional group, a hydroxyl functional group, an anhydride functional group, a carboxyl functional group, a sulfhydryl functional group, an ester functional group, or an ether functional group of the anchor molecule. The mixing step may further include adding the modified flame retardant to a continuous phase polymer.

In some embodiments, the method also may include reacting a phosphorus based flame retardant with a reactive functional group of a nanoparticle forming a modified flame retardant, and mixing the modified flame retardant with a polymer matrix. The reacting step may include reacting the phosphorus based flame retardant with at least one of an exfoliated graphite, graphene, or graphene oxide nanoparticle. The reacting step may further include reacting the nanoparticle with a macromolecule to produce the modified flame retardant. The reacting step may further include dispersing the modified flame retardant in a hydrophobic polymer matrix.

In some embodiments, the method also may include reacting a melamine (triazine) based flame retardant with a reactive functional group of a nanoparticle forming a modified flame retardant, and mixing the modified flame retardant with a polymer matrix. The reacting step may include reacting the melamine (triazine) based flame retardant with at least one of an exfoliated graphite, graphene, or graphene oxide nanoparticle. The reacting step may further include reacting the nanoparticle with a macromolecule to produce the modified flame retardant. The reacting step may further include dispersing the modified flame retardant in a hydrophobic polymer matrix.

In a further embodiment, the invention concerns modified flame retardant comprising a reaction product of a phosphorus based flame retardant with a reactive functional group of an anchor molecule. In some embodiments, the anchor molecule comprises a nanoparticle.

In a first aspect, a composition is provided. The composition comprises a first polymer and at least one nitrogenous compound anchored to the first polymer. The nitrogenous compound has a melting point in the range of −50 to 400° C. The composition releases non-flammable gases from the nitrogenous compound upon exposure of the composition to flame. The composition may be in the form of a fiber or other articles. The nitrogenous compound can be uniformly distributed in the composition or may have other distributions.

The first polymer may be selected the group consisting of nylon 6, nylon 66, polyethylene terephthalate (PET), polyester, polypropylene, polycarbonate, polyacetal, linear low-density polyethylene (LLDPE), low-density polyethylene (LDPE), high-density polyethylene (HDPE), and combinations thereof.

The nitrogenous compound may be selected from the group consisting of 1,3,5-triazine, 1,3,5-trimethylhexahydro-1,3,5-triazine, 3-Amino-1,2,4-triazine, 2-amino-4,6-dichloro-1,3,5-triazine, 3-Amino-5,6-dimethyl-1,2,4-triazine, 2-amino-4-methoxy-6-methyl-1,3,5-triazine, 2,4-diamino-6-methyl-1,3,5-triazine (acetoguanamine), 2,4-diamino-6-phenyl-1,3,5-triazine (benzoguanamine), 2,4-Diamino-6-hydroxypyrimidine, 3,5-diamino-1,2,4-triazole, 2,4-diamino-6-[3-(trifluoromethyl)phenyl]-1,3,5-triazine, 2,5-diamino-1,3,4-thiadiazole, 1,2,3-Triazole-4,5-dicarboxylic acid, amitrol, 3-amino-1,2,4-triazole-5-thiol, 2,4-diamino-6-hydroxypyrimidine, 1,2,4-triazole-3-carboxylic acid, 2,4-diaminopyrimidine, 2,4,6-triaminopyrimidine, triamterene, and combinations thereof.

The composition may further include a phosphorus-based flame retardant, such as red phosphorous, ammonium polyphosphate, trischloropropyl phosphate (TCCP), 9,10-Dihydro-9-oxa-10-phosphaphenanthrene-10-oxide (DOPO), 1,3,-Phenylene methylphosphonate (Fyrol PMP), or combinations thereof.

A method comprises processing the composition of any of the variations of the first aspect by one of extrusion, fiber melt spinning, or injection molding. Another method comprises adding the first polymer and the nitrogenous compound, thereby forming the composition of any of the variations of the first aspect. For example, the nitrogenous compound can be one of acetoguanamine or benzoguanamine.

In a second aspect, a fabric is provided. The fabric comprises a first set of fibers comprising 0.1 to 25% by weight of the fabric and a second set of fibers comprising a second polymer having a higher melting point than the first set of fibers. The first set of fibers comprises a first polymer and at least one nitrogenous compound having a melting point in the range of −50 to 400° C.

The first polymer may be selected the group consisting of nylon 6, nylon 66, polyethylene terephthalate (PET), polyester, polypropylene, polycarbonate, polyacetal, linear low-density polyethylene (LLDPE), low-density polyethylene (LDPE), high-density polyethylene (HDPE), and combinations thereof.

The nitrogenous compound may be selected from the group consisting of 1,3,5-triazine, 1,3,5-trimethylhexahydro-1,3,5-triazine, 3-Amino-1,2,4-triazine, 2-amino-4,6-dichloro-1,3,5-triazine, 3-Amino-5,6-dimethyl-1,2,4-triazine, 2-amino-4-methoxy-6-methyl-1,3,5-triazine, 2,4-diamino-6-methyl-1,3,5-triazine (acetoguanamine), 2,4-diamino-6-phenyl-1,3,5-triazine (benzoguanamine), 2,4-Diamino-6-hydroxypyrimidine, 3,5-diamino-1,2,4-triazole, 2,4-diamino-6-[3-(trifluoromethyl)phenyl]-1,3,5-triazine, 2,5-diamino-1,3,4-thiadiazole, 1,2,3-Triazole-4,5-dicarboxylic acid, amitrol, 3-amino-1,2,4-triazole-5-thiol, 2,4-diamino-6-hydroxypyrimidine, 1,2,4-triazole-3-carboxylic acid, 2,4-diaminopyrimidine, 2,4,6-triaminopyrimidine, triamterene, and combinations thereof. In particular, the nitrogenous compound may be acetoguanamine, benzoguanamine, or combinations thereof.

The first set of fibers can comprise 0.5 to 35% of the nitrogenous compound by weight.

The second set of fibers can comprise a material that is selected from the group consisting of nylon 6, nylon 66, polyethylene terephthalate (PET), polyester, polypropylene, polycarbonate, polyacetal, linear low-density polyethylene (LLDPE), low-density polyethylene (LDPE), high-density polyethylene (HDPE), and combinations thereof.

The fabric may further comprise a third set of fibers having a higher melting point than the second set of fibers. The third set of fibers can comprise cotton, rayon, wool, hair, silk, an aramid, or combinations thereof. The third set of fibers also can comprise metallic fibers that include copper, iron, silicon, alloys thereof, or combinations thereof. In addition to the third set of fibers, the fabric also may further comprise a fourth set of fibers having a melting point higher than the third set of fibers. The fourth set of fibers can comprise metallic fibers that include copper, iron, silicon, alloys thereof, or combinations thereof. In an instance, the first set of fibers comprises 0.1% to 25% of the fabric by weight, the second set of fibers comprise 0.1% to 99.8% of the fabric by weight, and the third set of fibers comprise 0.1% to 99.8% of the fabric by weight. In another instance, the first set of fibers comprises 0.1% to 25% of the fabric by weight, the second set of fibers comprise 0.1% to 99.7% of the fabric by weight, the third set of fibers comprise 0.1% to 99.7% of the fabric by weight, and the fourth set of fibers comprise 0.1% to 99.7% of the fabric by weight.

The fabric may further comprise at least one functionalized nanoparticle disposed on the first set of fibers or the second set of fibers. The functionalized nanoparticle can include clay; silica; or metallic nanoparticles comprising copper, iron, silicon, alloys thereof, or combinations thereof. The functionalized nanoparticle can be functionalized with at least one epoxide, amine, anhydride, hydroxyl, isocyanate, acid chloride, halide, carboxylic acid, aldehyde, ketone, or ester. The functionalized nanoparticle can crosslink with a second functionalized nanoparticle such that a covalent bond forms.

The first set of fibers can comprise 0.1% to 25% of the fabric by weight and the second set of fibers can comprise 75% to 99.9% of the fabric by weight.

The fabric may further comprise a phosphorus-based flame retardant. The phosphorus-based flame retardant can be red phosphorous, ammonium polyphosphate, trischloropropyl phosphate (TCCP), 9,10-Dihydro-9-oxa-10-phosphaphenanthrene-10-oxide (DOPO), 1,3,-Phenylene methylphosphonate (Fyrol PMP), or combinations thereof.

The fabric may be spiral wound.

In a third aspect, a bicomponent fiber is provided. The bicomponent fiber comprises a first set of fibers and a second set of fibers. The first set of fibers is 0.1% to 25% by weight of the bicomponent fiber. The first set of fibers further includes a polymer that is 65% to 99.5% by weight of the first set of fibers and a nitrogenous compound that is 0.5 to 35% by weight of the first set of fibers. The second set of fibers is 75% to 99.9% by weight of the bicomponent fiber. The second set of fibers further includes a polymer.

The polymer of the first set of fibers and/or the second set of fibers may be independently selected from i) nylon 6, nylon 66, polyethylene terephthalate (PET), polyester, polypropylene, polycarbonate, polyacetal, linear low-density polyethylene (LLDPE), low-density polyethylene (LDPE), high-density polyethylene (HDPE), and combinations thereof, or ii) cotton; rayon; wool; hair; silk; aramid; metallic fibers comprising copper, iron, silicon, alloys thereof, and combinations thereof; and combinations thereof.

The nitrogenous compound can be selected from the group consisting of 1,3,5-triazine, 1,3,5-trimethylhexahydro-1,3,5-triazine, 3-Amino-1,2,4-triazine, 2-amino-4,6-dichloro-1,3,5-triazine, 3-Amino-5,6-dimethyl-1,2,4-triazine, 2-amino-4-methoxy-6-methyl-1,3,5-triazine, 2,4-diamino-6-methyl-1,3,5-triazine (acetoguanamine), 2,4-diamino-6-phenyl-1,3,5-triazine (benzoguanamine), 2,4-Diamino-6-hydroxypyrimidine, 3,5-diamino-1,2,4-triazole, 2,4-diamino-6-[3-(trifluoromethyl)phenyl]-1,3,5-triazine, 2,5-diamino-1,3,4-thiadiazole, 1,2,3-Triazole-4,5-dicarboxylic acid, amitrol, 3-amino-1,2,4-triazole-5-thiol, 2,4-diamino-6-hydroxypyrimidine, 1,2,4-triazole-3-carboxylic acid, 2,4-diaminopyrimidine, 2,4,6-triaminopyrimidine, triamterene, and combinations thereof. In particular, the nitrogenous compound can be acetoguanamine, benzoguanamine, or combinations thereof.

A fabric can comprise a plurality of sets of fibers, wherein at least one set of fibers comprises the bicomponent fiber of any variation of the third aspect.

LIST OF FIGURES

For a fuller understanding of the nature and objects of the disclosure, reference should be made to the following detailed description taken in conjunction with the accompanying drawings.

DETAILED DESCRIPTION OF THE DISCLOSURE

Figure 1:
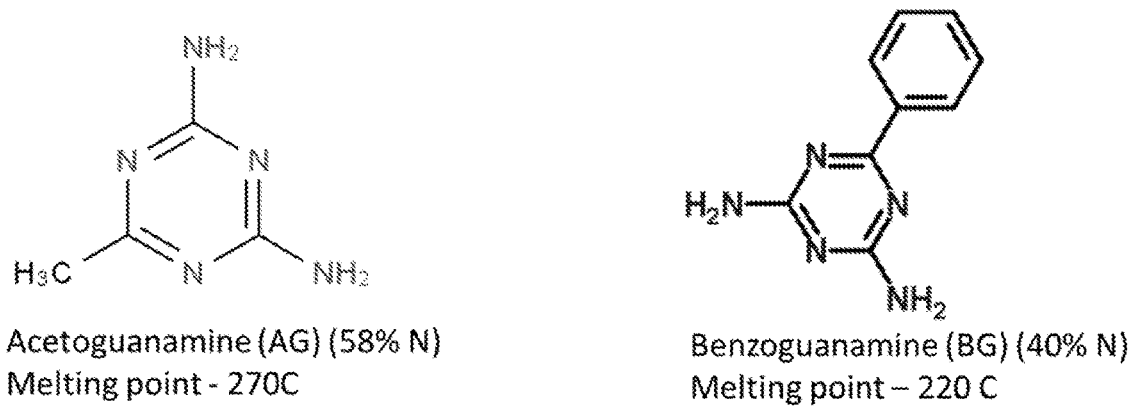
FIG. 1 shows chemical structures of meltable triazine derivatives.
Figure 2:
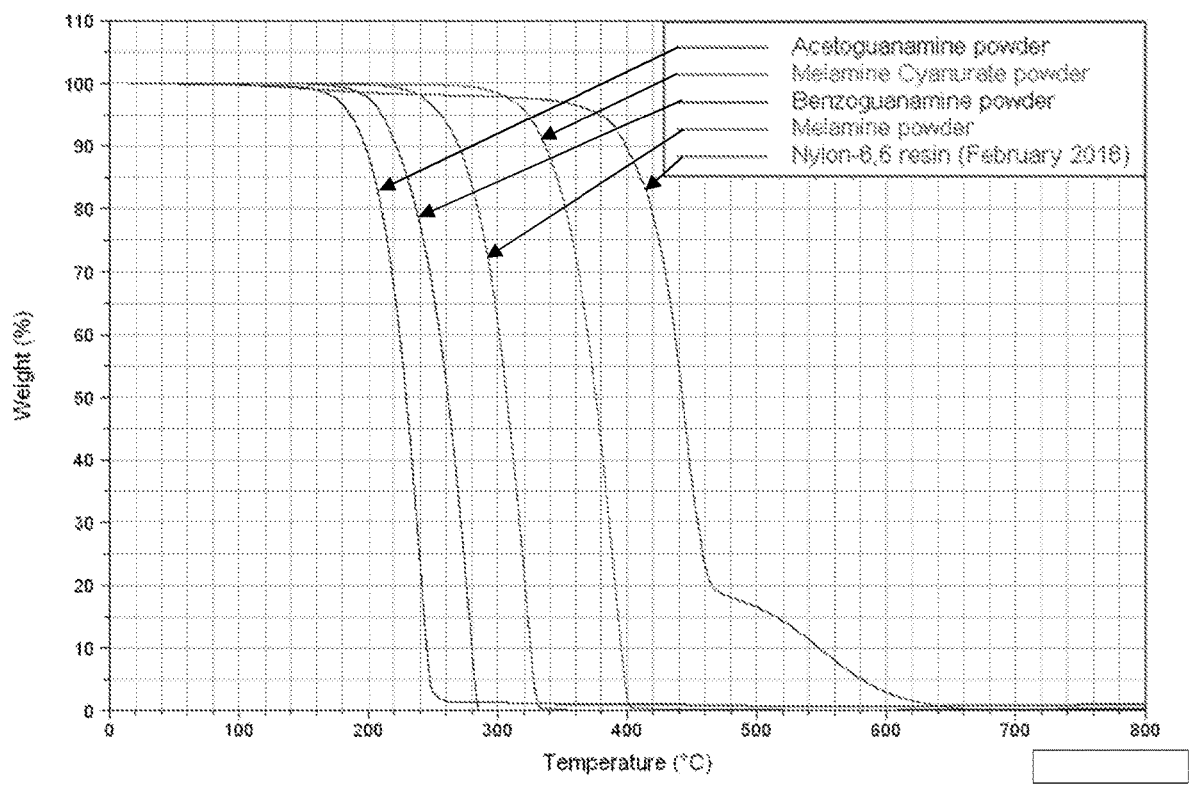
FIG. 2 shows thermogravimetric analysis of meltable triazine derivatives and compared to degradation of nylon 66.
Figure 3:
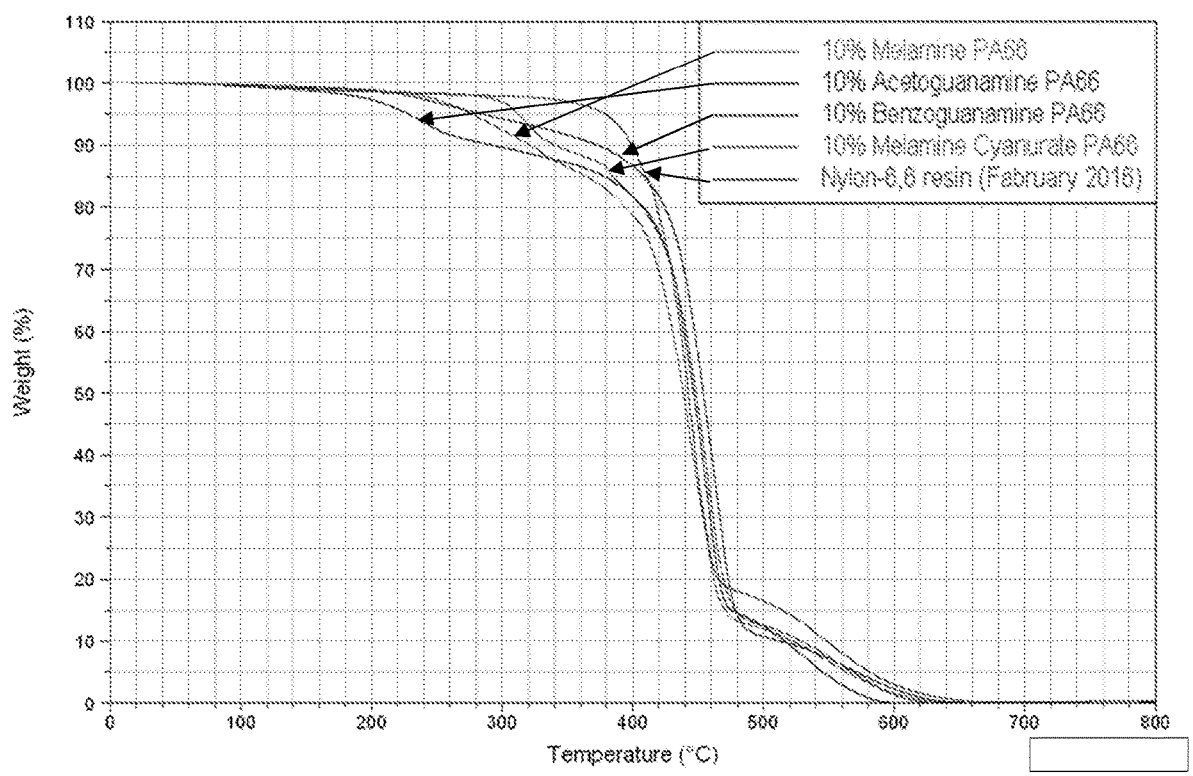
FIG. 3 shows thermogravimetric analysis of meltable triazine derivatives loaded into nylon 66. Results are compared against other triazine derivatives that are non-melting loaded into nylon 66.

Although claimed subject matter will be described in terms of certain embodiments, other embodiments, including embodiments that do not provide all of the benefits and features set forth herein, are also within the scope of this disclosure. Various structural, logical, and process step changes may be made without departing from the scope of the disclosure. Accordingly, the scope of the disclosure is defined only by reference to the appended claims.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using the compositions. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "approximately," it will be understood that the particular value forms another embodiment. In general, use of the term "approximately" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "approximately." In other cases, the gradations used in a series of values may be used to determine the intended range available to the term "approximately" for each value. Where present, all ranges are inclusive and combinable. That is, references to values stated in ranges include every value within that range.

In general, when a range is presented, all combinations of that range are disclosed. For example, 1 to 4 includes not only 1 to 4 but also 1 to 2, 1 to 3, 2 to 3, 2 to 4 and 3 to 4.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

As used herein, unless otherwise indicated, the term "alkyl" refers to branched or unbranched saturated hydrocarbon groups. Examples of alkyl groups include, but are not limited to, methyl groups, ethyl groups, propyl groups, butyl groups, isopropyl groups, tert-butyl groups, and the like. For example, the alkyl group can be a $C_1$ to $C_{12}$, including all integer numbers of carbons and ranges of numbers of carbons therebetween, alkyl group. The alkyl group can be unsubstituted or substituted with one or more substituent. Examples of substituents include, but are not limited to, various substituents such as, for example, halogens (—F, —Cl, —Br, and —I), aliphatic groups (e.g., alkyl groups, alkenyl groups, alkynyl groups), aryl groups, alkoxide groups, carboxylate groups, carboxylic acids, ether groups, and the like, and combinations thereof.

The above objects are met by the compounds, articles, and methods disclosed herein.

A composition is provided in a first aspect. The composition includes a first polymer and a nitrogenous compound. A nitrogenous compound can be defined as an organic or inorganic molecule that contains nitrogen and which has a melting point in the range of −50° C. to 400° C. The composition can release non-flammable gases from the nitrogenous compound upon exposure of the composition to flame. This can retard and in some cases extinguish the flame. A first polymer and one or more nitrogenous compounds may form a fiber and subsequently a fabric. However, the composition may be used in other articles than a fiber. The composition may be used in an article formed by extrusion, fiber melt spinning, or injection molding.

The nitrogenous compounds mentioned above includes derivatives of triazine. Non-limiting examples of such include 1,3,5-Triazine, 1,3,5-Trimethylhexahydro-1,3,5-triazine, 3-Amino-1,2,4-triazine, 2-Amino-4,6-dichloro-1,3,5-triazine, 3-Amino-5,6-dimethyl-1,2,4-triazine, 2-Amino-4-methoxy-6-methyl-1,3,5-triazine, 2,4-Diamino-6-methyl-1,3,5-triazine (acetoguanamine), 2,4-Diamino-6-phenyl-1,3,5-triazine (benzoguanamine), 2,4-Diamino-6-hydroxypyrimidine, 3,5-Diamino-1,2,4-triazole, 2,4-Diamino-6-[3-(trifluoromethyl)phenyl]-1,3,5-triazine, 2,5-diamino-1,3,4-thiadiazole, 1,2,3-Triazole-4,5-dicarboxylic acid, amitrol, 3-Amino-1,2,4-triazole-5-thiol, 2,4-Diamino-6-hydroxypyrimidine, 1,2,4-Triazole-3-carboxylic acid, 2,4-Diaminopyrimidine, 2,4,6-Triaminopyrimidine, or triamterene. Such molecules have a melting point in the range of approximately −50° C. to 400° C. Such meltable triazine derivatives can then be melt compounded with a polymer such as nylon and polyester. The triazine derivatives have decomposition temperatures that are below that of nylon and polyester.

In an example, the nitrogenous compound used is acetoguanamine. In another example, the nitrogenous compound used is benzoguanamine. In another example, the nitrogenous compound is a combination of acetoguanamine and benzoguanamine in various weight ratios (e.g., 1 to 4, which includes not only 1 to 4 but also 1 to 2, 1 to 3, 2 to 3, 2 to 4 and 3 to 4) or various percentages, where the nitrogenous compound is 0.1 to 99.9% by weight acetoguanamine, including all 0.1% values and ranges therebetween, and 0.1 to 99.9% by weight benzoguanamine, including all 0.1% values and ranges therebetween.

Acetoguanamine melts at approximately 270° C. and is compatible for melt compounding with nylon 66 and polyethylene terephthalate (PET). Benzoguanamine melts at approximately 220° C. and is compatible for melt compounding with nylon 6. Acetoguanamine and benzoguanamine are compatible with other fibers and nylon 66, PET, and nylon 6 are merely listed as examples.

One or more nitrogenous compounds, including nitrogenous compounds such as acetoguanamine and/or benzoguanamine, can be melt blended with nylon 6 and 66 in various weight ratios from 0.5% to 35%, including all ranges and values to the 0.1% therebetween. The weight ratio of acetoguanamine and/or benzoguanamine can be from 5% to 25%, 5% to 20% by weight, or preferably 5% to 15% by weight. While mentioned with respect to types of nylon, the nitrogenous compound or compounds can be melt blended into other materials in various ratios from 0.5% to 35% by weight, including all ranges and values to the 0.1% therebetween, where another material (e.g., nylon 6 and/or nylon 66) comprises the remaining percentage by weight.

The composition can include an additional material, such as, for example, another polymer, metallic fibers, or functionalized nanoparticles. The metallic fibers can include copper, iron, silicon, alloys thereof, or combinations thereof. The functionalized nanoparticle can include clay; silica; or metallic nanoparticles comprising copper, iron, silicon, alloys thereof, or combinations thereof. The functionalized nanoparticle can be functionalized with at least one epoxide, amine, anhydride, hydroxyl, isocyanate, acid chloride, halide, carboxylic acid, aldehyde, ketone, or ester.

Variations of the first polymer with the nitrogenous compound can be formed as a first fiber.

A fabric is provided in a second aspect. The fabric has a plurality of fibers which are made with a polymer containing meltable triazine compositions. In some embodiments, this fabric may be woven. When such fabrics or fibers are exposed to flame, non-flammable gases such as nitrogen and ammonia are released from the meltable triazines contained within the fibers such that the flames are retarded and in some cases extinguished.

The meltable triazine compounds can be melt blended with one type of polymer. For example, such a polymer can be nylon, polyester, polypropylene, polycarbonate, polyacetal, or combinations thereof. For example, the polymer can also be polyolefins, polystyrenes, other such polymers, and other combinations thereof capable of forming fibers. Such fibers containing meltable triazine compositions are referred to as first fibers.

The fabric can be made of two different types of fibers. The different types of fibers can be referred to as different sets of fibers (i.e., the first fiber describes a fiber from the first set of fibers) For example, the first fibers, which can include the meltable triazine compositions, can be polyethylene terephthalate (PET) and the second fibers can be nylon. The first and second fibers also may be the same. For example, the first and second fibers can be nylon. Nylon 6 and nylon 66 are commonly used nylons but other nylons may be utilized. In an example, the first fiber comprises 0.1 to 25% by weight of the fabric, including all 0.1% values and ranges therebetween, and the second fiber comprises 75 to 99.9% by weight of the fabric, including all 0.1% values and ranges therebetween, where the total percent by weight of the fabric is 100%. In another example, the first fiber comprises 0.1 to 10% by weight of the fabric, including all 0.1% values and ranges therebetween, and the second fiber comprises 90 to 99.9% by weight of the fabric, including all 0.1% values and ranges therebetween, where the total percent by weight of the fabric is 100%.

In certain embodiments, the first fibers may be spiral wound on the second fibers. The first fibers also may be woven in the same or an orthogonal direction to the second fibers. In other embodiments, the first and second fibers also can form a bicomponent fiber. In an example, the first fiber comprises 0.1 to 25% by weight of the bicomponent fiber, including all 0.1% values and ranges therebetween, and the second fiber comprises 75 to 99.9% by weight of the bicomponent fiber, including all 0.1% values and ranges therebetween, where the total percent by weight of the bicomponent fiber is 100%. In another example, the first fiber comprises 0.1 to 10% by weight of the bicomponent fiber, including all 0.1% values and ranges therebetween, and the second fiber is 90 to 99.9% by weight of the bicomponent fiber, including all 0.1% values and ranges therebetween, where the total percent by weight of the bicomponent fiber is 100%.

The fabric may include a plurality of third fibers. For example, the third fibers can be at least one of cotton, rayon, wool, hair, silk, or an aramid (such as KEVLAR). These third fibers may have a higher melting temperature than either the first fibers or the second fibers. In an example, the first fiber comprises 0.1 to 25% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, where the total percent by weight of the fabric is 100%. In another example, the first fiber comprises 0.1 to 10% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, and where the total percent by weight of the fabric is 100%.

The fabric also may include a plurality of metallic fibers as a third or fourth fiber. For example, the metallic fibers comprise copper, iron, silicon, alloys thereof, and combinations thereof. In an example where metallic fibers are a third fiber, the first fiber comprises 0.1 to 25% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, where the total percent by weight of the fabric is 100%. In another example where metallic fibers are a third fiber, the first fiber comprises 0.1 to 10% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, and where the total percent by weight of the fabric is 100%. In an example where metallic fibers are a fourth fiber, the first fiber comprises 0.1 to 25% by weight of the fabric, including all 0.1% values and ranges therebetween; the second fiber comprises 0.1 to 99.7% by weight of the fabric, including all 0.1% values and ranges therebetween; the third fiber comprises 0.1 to 99.7% by weight of the fabric, including all 0.1% values and ranges therebetween; and the fourth fiber comprises 0.1 to 99.7% of the fabric, including all 0.1% values and ranges therebetween, where the total percent by weight of the fabric is 100%. In another example, the first fiber comprises 0.1 to 10% by weight of the fabric, including all 0.1% values and ranges therebetween; the second fiber comprises 0.1 to 99.7% by weight of the fabric, including all 0.1% values and ranges therebetween; the third fiber comprises 0.1 to 99.7% by weight of the fabric, including all 0.1% values and ranges therebetween; and the fourth fiber comprises 0.1 to 99.7% of the fabric, including all 0.1% values and ranges therebetween, where the total percent by weight of the fabric is 100%.

In an example, a fabric comprises a plurality of functionalized nanoparticles. In a non-limiting example, the first fibers include nylon and silica nanoparticles functionalized with a hydroxyl functional group and the second fibers include nylon and silicon nanoparticles functionalized with an epoxy functional group. Additional non-limiting examples of nanoparticles include clay, silica, metallic nanoparticles, mica, functionalized derivatives thereof, and the like. The nanoparticles may comprise 0.1 to 40% by weight of the fabric, including all 0.1% values and ranges therebetween. In an instance, the nanoparticles may comprise 5% to 15% by weight of the fabric, including all 0.1% values and ranges therebetween.

In some embodiments, the first functional group or second functional group may include a flame retardant, such as a phosphorus compound. Non-limiting examples of phosphorus compounds include any pentavalent phosphorus compound. Other phosphorus compounds may be used.

In certain embodiments, at least one of the first polymer or second polymer may be a polyolefin that includes a water-releasing additive. Non-limiting examples of polyolefins include LLDPE, LDPE, HDPE, and PP.

In yet other embodiments, at least one of the first polymer or the second polymer may have a lower melting point than the other and contains a reactive crosslinker, such as an epoxy modified 9,10-dihydro-9-oxy-10-phosphaphenanthrene-10-oxide (DOPO). Additionally non-limiting examples include multifunctional epoxy molecules such as Trimethylolethane Triglycidyl Ether, SU8, and/or Erisys GE-31, GE-30, GE-40, GE-38, and GE-60 (CVC Chemicals).

In an example, different types of crosslinking chemistries are utilized, such as covalent bonding between the following pairs of reactants: epoxide-amine, epoxide-anhydride, anhydride-hydroxyl, anhydride-amine, amine-isocyanate, hydroxyl-isocyanate, or isocyanate-anhydride. Additional examples of possible pairs of reactions include, but are not limited to, acid chloride-amine, epoxy-phenol, epoxy-carboxylic acid, arene-anhydride, aldehyde-amine, ketone-amine, ester-amine, and alkyl halide-amine.

A method of weaving is provided in a third aspect. A plurality of first fibers and a plurality of second fibers of a second polymer are provided and weaved to form a composition. The polymer of the first fiber is configured to release non-flammable gases upon exposure to flame. The first fibers and second fibers are woven to form a fabric. In an example, the first fiber comprises 0.1 to 25% by weight of the fabric, including all 0.1% values and ranges therebetween, and the second fiber comprises 75 to 99.9% by weight of the fabric, including all 0.1% values and ranges therebetween, where the total percent by weight of the fabric is 100%. In another example, the first fiber comprises 0.1 to 10% by weight of the fabric, including all 0.1% values and ranges therebetween, and the second fiber comprises 90 to 99.9% by weight of the fabric, including all 0.1% values and ranges therebetween, where the total percent by weight of the fabric is 100%.

The first fibers may be spiral wound on the second fibers. The first fibers also may be woven in the same or an orthogonal direction to the second fibers. The first and second fibers also can form a bicomponent fiber. In an example, the first fiber comprises 0.1 to 25% by weight of the bicomponent fiber, including all 0.1% values and ranges therebetween, and the second fiber comprises 75 to 99.9% by weight of the bicomponent fiber, including all 0.1% values and ranges therebetween, where the total percent by weight of the bicomponent fiber is 100%. In another example, the first fiber comprises 0.1 to 10% by weight of the bicomponent fiber, including all 0.1% values and ranges therebetween, and the second fiber is 90 to 99.9% by weight of the bicomponent fiber, including all 0.1% values and ranges therebetween, where the total percent by weight of the bicomponent fiber is 100%.

A plurality of third fibers may be woven into the fabric. For example, the third fibers can be at least one of cotton, rayon, wool, hair, silk, or an aramid (such as KEVLAR). These third fibers may have a higher melting temperature than either the first fibers or the second fibers. In an example, the first fiber comprises 0.1 to 25% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, where the total percent by weight of the fabric is 100%. In another example, the first fiber comprises 0.1 to 10% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, and where the total percent by weight of the fabric is 100%.

A plurality of metallic fibers may be woven into the fabric as a third or fourth fiber. For example, the metallic fibers comprise copper, iron, silicon, alloys thereof, and combinations thereof. In an example where metallic fibers are a third fiber, the first fiber comprises 0.1 to 25% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, where the total percent by weight of the fabric is 100%. In another example where metallic fibers are a third fiber, the first fiber comprises 0.1 to 10% by weight of the fabric, including all 0.1% values and ranges therebetween; the second fiber comprises 0.1 to 99.8% by weight of the fabric, including all 0.1% values and ranges therebetween; and the third fiber comprises 0.1 to 99.8% by weight of the fabric, including all 0.1% values and ranges therebetween, and where the total percent by weight of the fabric is 100%. In an example where metallic fibers are a fourth fiber, the first fiber comprises 0.1 to 25% by weight of the fabric, including all 0.1% values and ranges therebetween; the second fiber comprises 0.1 to 99.7% by weight of the fabric, including all 0.1% values and ranges therebetween; the third fiber comprises 0.1 to 99.7% by weight of the fabric, including all 0.1% values and ranges therebetween; and the fourth fiber comprises 0.1 to 99.7% of the fabric, including all 0.1% values and ranges therebetween, where the total percent by weight of the fabric is 100%. In another example, the first fiber comprises 0.1 to 10% by weight of the fabric, including all 0.1% values and ranges therebetween; the second fiber comprises 0.1 to 99.7% by weight of the fabric, including all 0.1% values and ranges therebetween; the third fiber comprises 0.1 to 99.7% by weight of the fabric, including all 0.1% values and ranges therebetween; and the fourth fiber comprises 0.1 to 99.7% of the fabric, including all 0.1% values and ranges therebetween, where the total percent by weight of the fabric is 100%.

In an example, a fabric further comprises a plurality of functionalized nanoparticles. In a non-limiting example, the first fibers include nylon and silica nanoparticles functionalized with a hydroxyl functional group and the second fibers include nylon and silicon nanoparticles functionalized with an epoxy functional group. Additional non-limiting examples of nanoparticles include clay, silica, metallic nanoparticles, mica, functionalized derivatives thereof, and the like. The nanoparticles may comprise 0.1 to 40% by weight of the fabric, including all 0.1% values and ranges therebetween.

Benign and non-toxic flame retardants that are bonded with polymers are provided as a fourth embodiment. Flame retardant molecules such as meltable triazine molecules described herein may be anchored to a polymer matrix of an article or finished product, and are stably and uniformly distributed therein. Anchoring the flame retardant molecules to the polymer matrix can reduce the risk of the flame retardant molecules leaching and blooming to the surface of the article. This interlocking or anchoring of flame retardant molecules also can help offset the loss in mechanical properties of the finished polymer product when the flame retardants are used in excess to achieve a fire resistance rating. An advantage of attaching anchors to flame retardant molecules is that this can allow the anchored flame retardants to be mixed with a polymer matrix, even when the melting points of the flame retardant and the polymer matrix are substantially different. As long as the anchor molecules are capable of melting, mixing, and integrating with the polymer matrix during mixing, the flame retardant molecule may be carried along and distributed within the matrix.

In some embodiments, anchors are attached to the flame retardant molecules via either covalent, electrostatic, or van der Waals interactions prior to addition into the polymer matrix. In other embodiments, the flame retardants may be reacted or bound to an anchor during the processing of adding the flame retardant to the polymer article. In these embodiments, both the anchor and the flame retardants may be separately added during processing of the polymer into a final article.

The anchors may be tuned to the chemical environment of the polymer article. For example, the anchors may have a substantially similar chemical structure as that of the polymer matrix and/or be compatible with the polymer. The anchor and flame retardant combination conjugate may be a separate entity from the polymer allowing the final product to be easily recycled. This also allows a new product produced from the recycled product to maintain the flame retardants and possess the flame retardant properties of the original article.

Flame retardant articles are disclosed as a fifth aspect. The flame retardant article, in addition to the nitrogenous flame retardants described herein, also may include a phosphorus based flame retardant chemically joined (e.g., covalently linked) to a reactive functional group of an anchor molecule forming a conjugate, wherein the conjugate is dispersed in the polymer matrix.

The phosphorus based flame retardant may be at least one of red phosphorous, ammonium polyphosphate, Trischloropropyl phosphate (TCCP), 9,10-Dihydro-9-oxa-10-phosphaphenanthrene-10-oxide (DOPO), and 1,3,-Phenylene methylphosphonate (Fyrol PMP). The anchor may be an amine modified or anhydride modified polymer having at least one of an epoxy functional group, a hydroxyl functional group, an anhydride functional group, a carboxyl functional group, a sulfhydryl functional group, an ester functional group, an ether functional group, or other functional groups. Alternatively, the anchor may be a nanoparticle, such as exfoliated graphite, graphene, or graphene oxide. The anchor may also include a macromolecule chemically joined to a surface of the nanoparticle. Additional non-limiting examples of nanoparticles include clay, silica, metallic (e.g., iron, copper, alloys thereof, and combinations thereof), mica, and the like.

Methods of making flame retardant articles are disclosed as a sixth aspect. The method may include reacting a phosphorus based flame retardant with a reactive functional group of an anchor molecule forming a modified flame retardant, and mixing the modified flame retardant with a polymer matrix. The reacting step may further include reacting the phosphorus based flame retardant with at least one of an epoxy functional group, a hydroxyl functional group, an anhydride functional group, a carboxyl functional group, a sulfhydryl functional group, an ester functional group, or an ether functional group of the anchor molecule. The mixing step may further include adding the modified flame retardant to a continuous phase polymer.

In some embodiments, the method also may include reacting a phosphorus based flame retardant with a reactive functional group of a nanoparticle forming a modified flame retardant, and mixing the modified flame retardant with a polymer matrix. The reacting step may include reacting the phosphorus based flame retardant with at least one of an exfoliated graphite, graphene, or graphene oxide nanoparticle. The reacting step may further include reacting the nanoparticle with a macromolecule to produce the modified flame retardant. The reacting step may further include dispersing the modified flame retardant in a hydrophobic polymer matrix.

In some embodiments, the method also may include reacting a melamine (triazine) based flame retardant with a reactive functional group of a nanoparticle forming a modified flame retardant, and mixing the modified flame retardant with a polymer matrix. The reacting step may include reacting the melamine (triazine) based flame retardant with at least one of an exfoliated graphite, graphene, or graphene oxide nanoparticle. The reacting step may further include reacting the nanoparticle with a macromolecule to produce the modified flame retardant. The reacting step may further include dispersing the modified flame retardant in a hydrophobic polymer matrix.

In a further aspect, the invention concerns modified flame retardant comprising a reaction product of a phosphorus based flame retardant with a reactive functional group of an anchor molecule. In some embodiments, the anchor molecule comprises a nanoparticle.

Other aspects can be derived from the instant disclosure.

The following examples are presented to illustrate the present disclosure. They are not intended to be limiting in any matter.

EXAMPLES

In a first example, acetoguanamine (Sigma Aldrich Chemicals) at 5% loading was premixed as a dry powder blend with nylon 66 fines (Ascend Polymers). The resulting powder blend was fed into the hopper of a 20 mm twin screw laboratory extruder made by LabTech (Thailand) at 265° C.

The melt blended formulation was then cooled and pelletized. The resulting samples tested under UL94 conditions showed V0 behavior.

In a second example, benzoguanamine (Sigma Aldrich Chemicals) at 5% loading was premixed as a dry powder blend with nylon 66 fines (Ascend Polymers). The resulting powder blend was fed into the hopper of a 20 mm twin screw laboratory extruder made by LabTech (Thailand) at 265° C. The melt blended formulation was then cooled and pelletized. The resulting samples tested under UL94 conditions showed V0 behavior.

In a third example, acetoguanamine and benzoguanamine (Sigma Aldrich Chemicals) at 2.5% loading each (totaling a 5% loading) were premixed as a dry powder blend with nylon 66 fines (Ascend Polymers). The resulting powder blend was fed into the hopper of a 20 mm twin screw laboratory extruder made by LabTech (Thailand) at 265° C. The melt blended formulation was then cooled and pelletized. The resulting samples tested under UL94 conditions showed V0 behavior.

In a fourth example, acetoguanamine (Sigma Aldrich Chemicals) at 5% loading was premixed as a dry powder blend with nylon 66 fines (Ascend Polymers). To this mixture was added various flame retardants such as red phosphorous, ammonium polyphosphate, trischloropropyl phosphate (TCCP), 9,10-Dihydro-9-oxa-10-phosphaphenanthrene-10-oxide (DOPO), and 1,3,-Phenylene methylphosphonate (Fyrol PMP). The loading of the phosphorus based flame retardants was kept lower than 20%. The resulting powder blend was fed into the hopper of a 20 mm twin screw laboratory extruder made by LabTech (Thailand) at 265° C. The melt blended formulation was then cooled and pelletized. The resulting samples tested under UL94 conditions showed V0 behavior.

In a fifth example, a multiepoxy molecule, such as Trimethylolethane Triglycidyl Ether or SU8, was pre-reacted under suitable conditions and presence of suitable catalysts (like tertiary amines) with either acetoguanamine or benzoguanamine in a stoichiometry such that at least one epoxy functional group was available for further reaction. The resulting molecule was then blended as a powder with nylon 66 fines. The resulting powder blend was fed into the hopper of a 20 mm twin screw laboratory extruder made by LabTech (Thailand) at 265° C. The melt blended formulation was then cooled and pelletized. The resulting samples tested under UL94 conditions showed V0 behavior. The resulting nylon 66 molecules are expected to contain covalently immobilized epoxy-acetoguanamine or epoxy-benzoguanamine adducts onto the nylon 66 molecules.

In a sixth example, a multiepoxy molecule, such as SU8, was pre-reacted under suitable conditions and presence of suitable catalysts (like tertiary amines) with either acetoguanamine or benzoguanamine in the presence of epoxy reactive phosphorus based flame retardants such as 9,10-Dihydro-9-oxa-10-phosphaphenanthrene-10-oxide (DOPO), in such stoichiometry such that at least one or more epoxy functional group was available for further reaction. The resulting molecule can be tuned to contain different amounts of acetoguanamine (or benzoguanamine) and DOPO molecules per molecule of SU8 by varying the stoichiometry of the reactants. The resulting molecule was then blended as a powder with nylon 66 fines. The resulting powder blend was fed into the hopper of a 20 mm twin screw laboratory extruder made by LabTech (Thailand) at 265° C. The melt blended formulation was then cooled and pelletized. The resulting samples tested under UL94 conditions showed V0 behavior. The resulting nylon 66 molecules are expected to contain covalently immobilized epoxy-acetoguanamine/DOPO or epoxy-benzoguanamine/DOPO adducts onto the nylon 66 molecules.

In a seventh example, a multiepoxy molecule, such as Tris (2, 3-Epoxy propyl) Isocyanurate is a tri-functional epoxy compound consisting of a triazine ring and three glycidyl groups was pre-reacted under suitable conditions and presence of suitable catalysts (like tertiary amines) with either acetoguanamine or benzoguanamine in the presence of epoxy reactive phosphorus based flame retardants such as 9,10-Dihydro-9-oxa-10-phosphaphenanthrene-10-oxide (DOPO), in such stoichiometry such that at least one or more epoxy functional group was available for further reaction. The resulting molecule can be tuned to contain different amounts of acetoguanamine (or benzoguanamine) and DOPO molecules per molecule of the epoxy compound by varying the stoichiometry of the reactants. The resulting molecule was then blended as a powder with nylon 66 fines. The resulting powder blend was fed into the hopper of a 20 mm twin screw laboratory extruder made by LabTech (Thailand) at 265° C. The melt blended formulation was then cooled and pelletized. The resulting samples tested under UL94 conditions showed V0 behavior. The resulting nylon 66 molecules are expected to contain covalently immobilized epoxy-acetoguanamine/DOPO or epoxy-benzoguanamine/DOPO adducts onto the nylon 66 molecules.

Although the present disclosure has been described with respect to one or more particular embodiments and/or examples, it will be understood that other embodiments and/or examples of the present disclosure may be made without departing from the scope of the present disclosure.

What is claimed is:

1. A composition comprising:
   a first polymer; and
   at least one nitrogenous compound anchored to the first polymer, wherein the nitrogenous compound has a melting point in the range of −50 to 400° C., wherein the nitrogenous compounds are selected from the group consisting of 1,3,5-triazine, 1,3,5-trimethylhexahydro-1,3,5-triazine, 3-amino-1,2,4-triazine, 2-amino-4,6-dichloro-1,3,5-triazine, 3-amino-5,6-dimethyl-1,2,4-triazine, 2-amino-4-methoxy-6-methyl-1,3,5-triazine, 2,4-diamino-6-methyl-1,3,5-triazine (acetoguanamine), 2,4-diamino-6-phenyl-1,3,5-triazine (benzoguanamine), 2,4-diamino-6-hydroxypyrimidine, 3,5-diamino-1,2,4-triazole, 2,4-diamino-6-[3-(trifluoromethyl)phenyl]-1,3,5-triazine, 2,5-diamino-1,3,4-thiadiazole, 1,2,3-triazole-4,5-dicarboxylic acid, amitrol, 3-amino-1,2,4-triazole-5-thiol, 2,4-diamino-6-hydroxypyrimidine, 1,2,4-triazole-3-carboxylic acid, 2,4-diaminopyrimidine, 2,4,6-triaminopyrimidine, triamterene, and combinations thereof;
   wherein the composition releases non-flammable gases from the nitrogenous compound upon exposure of the composition to flame.

2. The composition of claim 1, wherein the composition is in the form of a fiber.

3. The composition of claim 1, wherein the first polymer is selected the group consisting of nylon 6, nylon 66, polyethylene terephthalate (PET), polyester, polypropylene, polycarbonate, polyacetal, linear low-density polyethylene (LLDPE), low-density polyethylene (LDPE), high-density polyethylene (HDPE), and combinations thereof.

4. The composition of claim 1, wherein the nitrogenous compound is uniformly distributed in the composition.

5. The composition of claim 1, wherein the composition further comprises a phosphorus-based flame retardant, wherein the phosphorus-based flame retardant is red phosphorous, ammonium polyphosphate, trischloropropyl phosphate (TCCP), 9,10-dihydro-9-oxa-10-phospha-phenanthrene-10-oxide (DOPO), 1,3,-phenylene methylphosphonate (Fyrol PMP), or combinations thereof.

6. A method comprising processing the composition of claim 1 by one of extrusion, fiber melt spinning, or injection molding.

\* \* \* \* \*